Figure 1:
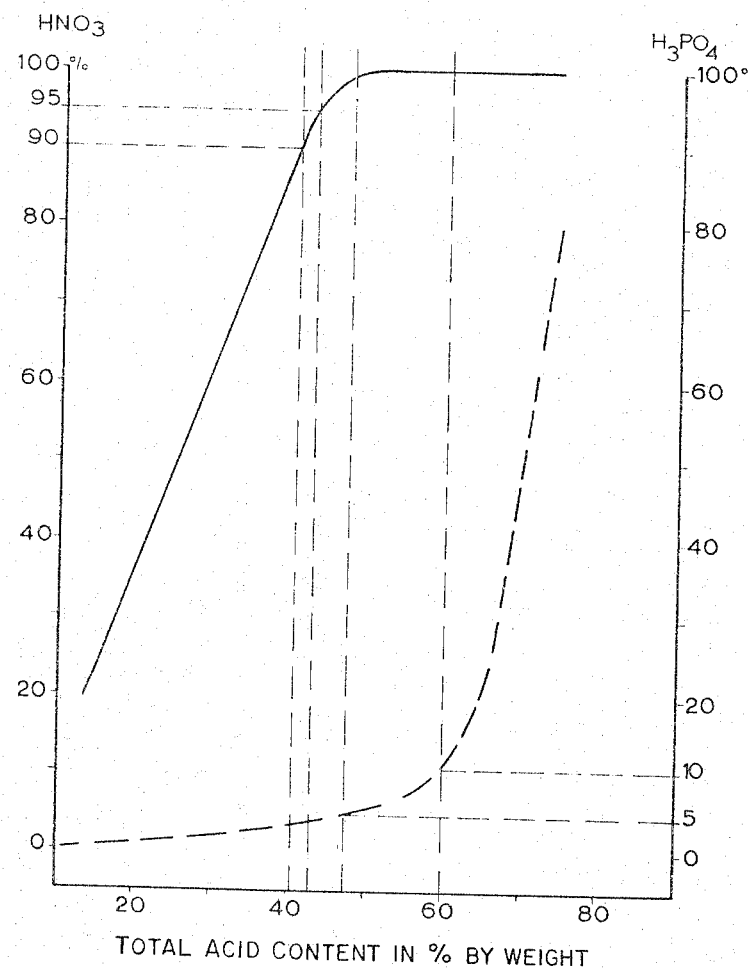

3,363,978
PROCESS FOR RECOVERING PHOSPHORIC ACID FROM AQUEOUS SOLUTIONS CONTAINING NITRIC ACID AND PHOSPHORIC ACID

Abraham H. de Rooij, Geleen, and Jan Elmendorp, Brunssum, Netherlands, assignors to Stamicarbon N.V., Heerlen, Netherlands
Filed Oct. 6, 1964, Ser. No. 401,865
Claims priority, application Netherlands, Oct. 8, 1963, 298,968
5 Claims. (Cl. 23—165)

The present invention relates to a process for recovering phosphoric acid from aqueous solutions containing nitric acid and phosphoric acid.

More specifically the invention relates to the recovery of phosphoric acid from solutions obtained in the decomposition of phosphate rock with concentrated nitric acid. In the past it has not been considered feasible to prepare relatively pure phosphoric acid from these solutions since it was considered virtually impossible to effect the necessary quantitative separation of the calcium nitrate formed in the decomposition. Additionally separation of the nitric acid from the phosphoric acid, e.g., by rectification, was unattractive from a technical and economical point of view.

It has been proposed that an extraction with a slightly water-miscible aliphatic alcohol, such as butyl alcohol or amyl alcohol, might be used to obtain a more or less quantatative separation of calcium nitrate from the solution obtained by decomposing phosphate rock with concentrated nitric acid. However, the resulting products are relatively dilute aqueous solutions which contain nitric acid and phosphoric acid and can be separated only by rectification, with all the attendant disadvantages. These disadvantages include attack by corrosive mixtures, partial decomposition of $HNO_3$ into nitrous gases, and high steam consumption as well as a phosphoric acid which is still not completely free of nitric acid.

In view of the foregoing, the principal object of the present invention is to provide a process for recovering substantially pure phosphoric acid from aqueous solutions containing nitric acid and phosphoric acid, particularly solutions obtained by decomposing phosphate rock with concentrated nitric acid, while eliminating prior art problems. Other objects will also be hereinafter apparent.

Broadly stated, the objects of the invention are accomplished by the discovery that a thorough separation between nitric acid and phosphoric acid can be effected if the aqueous solution containing the acids is extracted with a poorly water-miscible organic solvent selected from the group consisting of lower aliphatic ethers and lower aliphatic ketones and the starting solution of acids preferably contains at least 40 and not more than 70% by weight of water, i.e., the total acid concentration lies between 60 and 30% by weight of acid. At higher acid concentrations, the extracting agent appears to become more and more miscible with water, so that quantitative separation is not possible while at lower acid concentrations, the extraction of the nitric acid is incomplete.

Lower aliphatic ethers and ketones useful as the extracting solvent include, for example, diethyl ether, diisopropyl ether, dibutyl ether, diisoamyl ether, methyl-isobutyl ketone, dibutyl carbitol, butyl-ethyl ketone, methyl-isoamyl ketone, diisobutyl ketone. For reasons of economy methyl-isobutyl ketone is preferably used as the extracting agent, since this compound is cheap and also highly selective in absorbing the nitric acid. However, effective results can be obtained with any of the other ethers and ketones indicated above.

In carrying out the invention, the nitric acid is taken up by the organic solvent extracting agent, while the phosphoric acid remains as an aqueous solution, which is concentrated further. It has previously been known that in general nitric acid is more readily extracted from an aqueous solution thereof using the above lower aliphatic ketones or ethers than phosphoric acid is from a similar aqueous solution containing phosphoric acid (see, for instance, R. M. Diamond and D. G. Tuck's article in Progress in Organic Chemistry, vol. II, pp. 109–192, entitled: Extraction of Inorganic Compounds into Organic Solvents). However, from this prior knowledge, it could not have been foreseen that a satisfactory quantitative separation could be obtained with the above organic solvents provided the acid concentration in the aqueous starting solution is kept within certain limits. Additionally, to obtain thorough separation between the nitric acid and phosphoric acid from these aqueous solutions it is important that the ratio between the amount of solution and the amount of solvent in contact therewith be kept within certain limits. Thus the weight ratio between the aqueous solution containing acids and the extracting agent is preferably kept between the limits 1:1 and 1:3.

Table I below illustrates the extent to which phosphoric acid and nitric acid are absorbed by the organic extracting agent. This table is a compilation of the results of experiments in which an amount of an acid solution containing 18% by weight of $H_3PO_4$ in addition to 6% by weight of $HNO_3$ was stirred, for half an hour at 20° C., with three times the amount by weight of organic solvent, followed by removal of the aqueous layer and the organic solvent, and determination of the amount of acid taken up by the solvent as a percentage of the amount of acid originally contained in the aqueous solution.

TABLE I

| Extracting agent | Amount of Acid extracted, percentage of original amount | |
|---|---|---|
| | $HNO_3$ | $H_3PO_4$ |
| Dibutyl ether | 7.6 | 1.8 |
| Diethyl ether | 37 | 1.6 |
| Diisopropyl ether | 26 | 1.0 |
| Diisoamyl ether | 8.1 | 1.8 |
| Diisobutyl ether | 28 | 0.6 |
| Butyl-ethyl ketone | 31 | 0.7 |
| Methyl-isoamyl ketone | 40 | 0.7 |
| Methyl-isobutyl ketone | 49 | 0.4 |
| Dibutyl carbitol | 42 | 0.1 |

Table II below shows that an effective separation between nitric acid and phosphoric acid can be obtained by continuous extraction, or by a comparable discontinuous multiple-stage extraction, with an organic solvent, provided that the total acid content of the aqueous solution is kept within certain limits. The data shown in Table II was obtained by means of experiments in which a solution containing nitric acid and phosphoric acid was extracted in an extraction column at room temperature, in countercurrent relation to methyl-isobutyl ketone, the liquids being passed together through the column in the amount of 1/2 litre per hour per cm.² of column section.

TABLE II

| Composition of solution, percent by weight | | | Ratio between weight of solution and weight of methylisobutyl ketone | Amount of acid extracted, percentage of original amount | |
| --- | --- | --- | --- | --- | --- |
| $HNO_3$ | $H_3PO_4$ | Total acid | | $HNO_3$ | $H_3PO_4$ |
| 21 | 51 | 72 | 1:1 | 100 | 63 |
|  |  |  | 1:3 | 100 | 64.5 |
| 8 | 43 | 51 | 1:1 | 99.8 | 6.2 |
|  |  |  | 1:2 | 99.8 | 8.1 |
|  |  |  | 1:3 | 99.8 | 22.5 |
| 10 | 29 | 39 | 1:1 | 87.5 | 3.5 |
|  |  |  | 1:3 | 98.9 | 3.8 |
| 9 | 21 | 30 | 1:1 | 59.5 | 1.2 |
|  |  |  | 1:2 | 84.0 | 1.6 |
|  |  |  | 1:3 | 92.4 | 1.6 |
| 5.5 | 8.5 | 14 | 1:1 | 21.0 | 0.2 |
|  |  |  | 1:2 | 41.5 | 0.4 |
|  |  |  | 1:3 | 60 | 0.8 |

Figure 2:
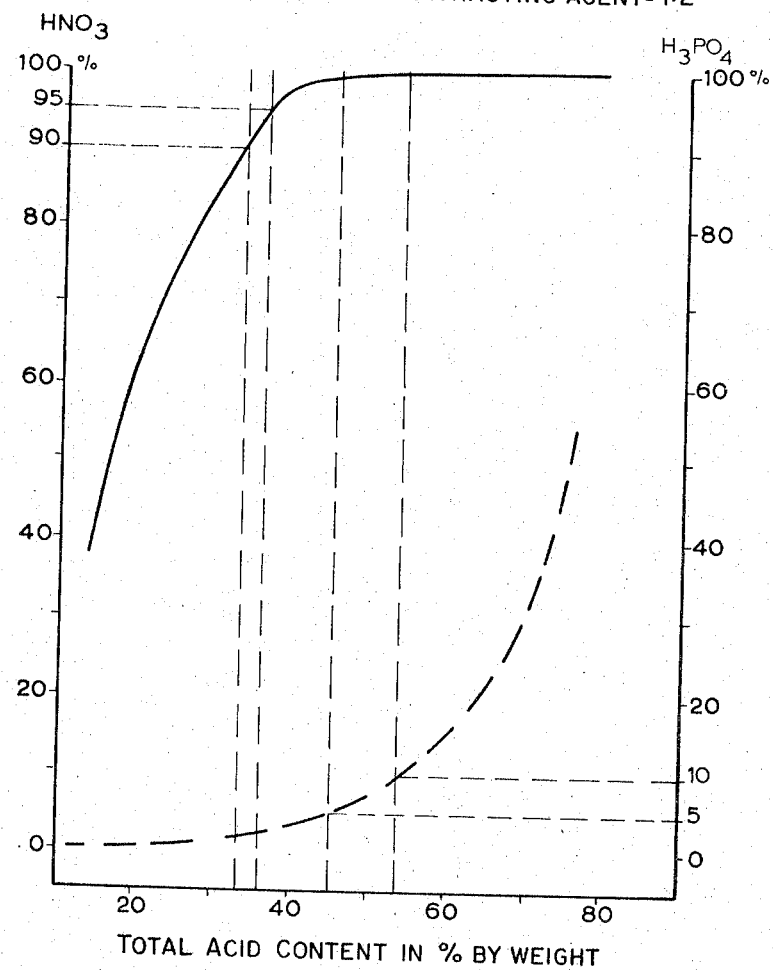
Figure 3:
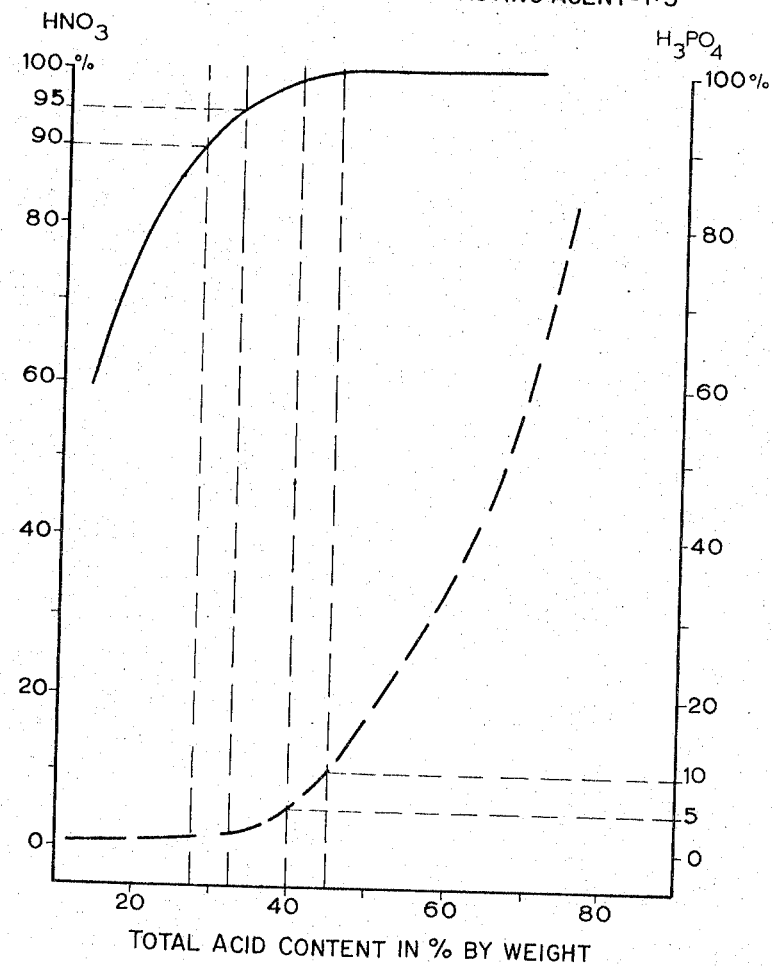

The values given in Table II are graphically represented in the FIGURES 1, 2 and 3. In particular, FIG. 1 relates to a continuous extraction in which the weight ratio between the solvent and the extracting agent is 1:1; while the weight ratios in FIGURES 2 and 3 are 1:2 and 1:3, respectively. The total acid content, in percent by weight, is plotted on the abscissa, the amount of acid extracted, as a percentage of the original amount, on the ordinates.

From the graphs constituting FIGURES 1-3, it will be noted that, depending on the ratio between the solution and methyl-isobutyl ketone, a thorough separation between the acids can be effected at a given concentration of acids. Thus, at a weight ratio between solution and methyl-isobutyl ketone of 1:1 and at an acid content of 40-60% by weight, at least 90% of the nitric acid contained in the solution is extracted, as against at most 10% of the phosphoric acid, so that an aqueous solution remains which is rich in phosphoric acid and poor in nitric acid.

At an acid content of about 45% by weight, the separation with methyl-isobutyl ketone is most selective at the ratio of 1:1, for in this case 97.5% of the nitric acid originally contained in the solution is taken up by the extracting agent, as against only 4% of the phosphoric acid.

If the ratio between solution and methyl-isobutyl ketone becomes lower, e.g., 1:2 or 1:3, the concentration ranges in which a selective separation can be realized are slightly shifted towards a lower concentration range. Thus, if the ratio is 1:2 or 1:3, a selective separation is obtained at a total acid content of about 40% by weight and about 36% by weight, respectively. If, instead of methyl-isobutyl ketone, other lower aliphatic ketones or ethers are used as extracting agent, virtually the same results are obtained.

The composition of the solution to be extracted, i.e., the ratio between phosphoric acid and nitric acid in the starting solution, is of minor importance to the selectivity of the separation. However, of crucial importance is the proper choice of the total acid concentration range and consequently the water content. Roughly, it may be stated that a reasonable separation between phosphoric acid and nitric acid can be obtained if the total acid concentration ranges between 30 and 60% by weight of acid, i.e., if the solution contains 70-40% by weight of water. Within these limits a ratio between solution and extracting agent of, for example, 1:2 or 1:3, is chosen for a more diluted solution against a ratio of 1:1 for more concentrated solutions.

As will be appreciated the process of the invention may be applied advantageously to any aqueous solution containing phosphoric acid and nitric acid with the concentration limits prescribed herein. However, the invention is of particular importance, as will be appreciated from the foregoing, for the separation of phosphoric acid and nitric acid from solutions that are obtained in the decomposition of phosphate rock with concentrated nitric acid after the dissolved calcium nitrate has first been removed from the resulting decomposition liquor. To obtain a solution containing phosphoric acid and nitric acid in concentrations high enough to use the invention, it will be recognized that some measures must be taken in the decomposition of the phosphate rock and in the removal of the dissolved calcium nitrate. Thus, for example, the decomposition of the phosphate may be effected, with a small excess of concentrated nitric acid, the concentration of the nitric acid being at least 45% by weight and preferably 60% by weight.

The addition of nitric acid in the decomposition of phosphate rock forms calcium nitrate and a large part of this nitrate is first removed from the resulting solution as crystals by cooling the solution to, e.g., 12° C., in order to obtain a solution with a molar $CaO/P_2O_5$ ratio of below 1.5. This makes it possible to separate the acids in solution from the major part of the calcium nitrate still in solution by extracting with a relatively small amount of a slightly water-miscible organic solvent, e.g., a lower aliphatic alcohol of poor water miscibility, e.g., an alkanol selected from the group consisting of butyl and amyl alcohols. In this extraction the acids and a small amount of calcium nitrate are taken up by the organic solvent, the remainder of the calcium nitrate being retained in the aqueous layer. The organic solvent, which contains the acids and also some calcium nitrate, is subsequently washed with a small amount of a solution containing phosphoric acid and, possibly, some nitric acid, the total acid content being at least 25% by weight. By this operation the calcium nitrate is washed from the organic solvent and the solvent which still contains acids is rewashed with such a limited amount of water that not more than ¾ of the total amount of acids in solution is dissolved. The organic solvent which still contains acids is again used for the extractive separation between calcium nitrate and the acids.

The resulting aqueous solution containing acids is sufficiently concentrated to effect the separation between nitric acid and phosphoric acid according to the invention by means of extraction with a small amount of a poorly water-miscible lower aliphatic ketone or a lower aliphatic ether. The resulting mixture containing phosphoric acid and water is concentrated by distillation, while the organic solvent containing little phosphoric acid and much nitric acid is free of the phosphoric acid by washing with a small amount of water and then processed to ammonium nitrate by neutralization with $NH_3$.

Figure 4:
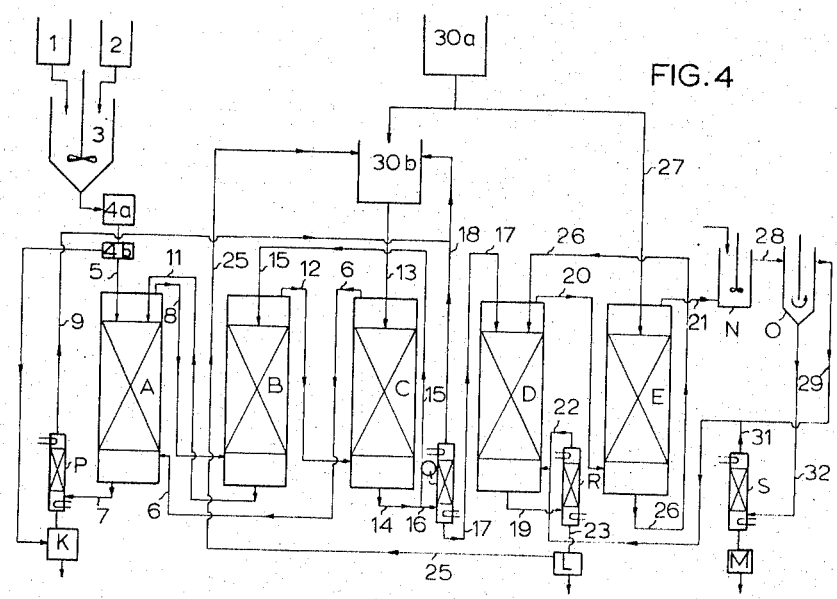

FIG. 4 gives a schematic representation of the recovery of phosphoric acid from phosphate rock and concentrated nitric acid.

The invention is further illustrated by the following example:

From reservoirs 1 and 2, respectively, 257 kg. of phosphate rock, which contains 50.3% by weight of CaO, 38.9% by weight of $P_4O_5$, 3.3% by weight of F, and 558 kg. of 60% by weight $HNO_3$ are passed into reactor 3. The reaction mixture is cooled to 12 to 13° C. in crystallizer 4a, which produces 410 kg. of $Ca(NO_3)_2 \cdot 4$ aq. crystals. In centrifuge 4b these crystals are separated from the mother liquor and washed with nitric acid. 400 kg. of mother liquor, molar $CaO/P_2O_5$ ratio=0.8, composition:

|  | kg. |
| --- | --- |
| $Ca(NO_3)_2$ | 94 |
| $HNO_3$ | 34 |
| $H_3PO_4$ | 138 |
| $H_2SiF_6$ | 10.6 |
| Impurities | 20 |
| and |  |
| $H_2O$ | 103 | is passed through conduit 5 into the top of extraction column A.

In addition, 184 kg. of a solution from extraction column B is passed into this column through conduit 11. This solution contains, besides 104 kg. of water,

| | kg. |
|---|---|
| $Ca(NO_3)_2$ | 39.5 |
| $HNO_3$ | 15 |
| $H_3PO_4$ | 20 |
| $H_2SiF_6$ | 0.3 |
| Butanol | 5 |

The aqueous solutions are extracted in extraction column A in counter-current relation to 1764 kg. of acidulated butanol. The latter, supplied through conduit 6, consists of:

| | kg. |
|---|---|
| Butanol | 1240 |
| Water | 400 |
| $HNO_3$ | 93 |
| $H_3PO_4$ | 31 |
| $H_2SiF_6$ | 0.2 |

This extraction yields 590 gg. of a calcium nitrate solution, which is passed through conduit 7 to stripping column P to recover the butanol still in solution (7 kg.). Thereafter the solution is processed to calcium nitrate in evaporator K, while 1758 kg. of an extract consisting of:

| | kg. |
|---|---|
| Butanol | 1238 |
| Water | 150 |
| $HNO_3$ | 141 |
| $H_3PO_4$ | 188 |
| $Ca(NO_3)_2$ | 40 |
| $H_2SiF_6$ | 1 | issues from the top of the column. This extract is fed through conduit 8 into the bottom of column B, where it is washed with 554 kg. of a washing liquid supplied through conduit 15 and containing, besides 366 kg. of water,

| | kg. |
|---|---|
| $H_3PO_4$ | 157 |
| $HNO_3$ | 18 |
| $Ca(NO_3)_2$ | 0.6 |
| $H_2SiF_6$ | 0.4 |
| Butanol | 12 |

This washing treatment yields the 184 kg. of solution to be passed into column A through conduit 11 and a washed extract which is to be passed into extraction column C containing in addition to 1245 kg. of butanol,

| | kg. |
|---|---|
| $HNO_3$ | 144 |
| $H_3PO_4$ | 325 |
| $Ca(NO_3)_2$ | 1.1 |
| $H_2SiF_6$ | 1.1 |
| Water | 412 |

In column C this washed extract is washed with 640 kg. of water supplied from reservoir 30b through conduit 13. 17 kg. of butanol from the rectifying columns P and Q are added to this water through conduits 9 and 18. This washing treatment yields a butanol solution which is largely free of the acids and which is returned to the extraction column A through conduit 6, and a solution (1056 kg.) containing phosphoric acid and nitric acid, which solution is to be discharged through conduit 14. This solution has the following composition:

| | kg. |
|---|---|
| $HNO_3$ | 51 |
| $H_3PO_4$ | 294 |
| $Ca(NO_3)_2$ | 1.1 |
| $H_2SiF_6$ | 0.9 |
| Water | 687 |
| Butanol | 22 |

Through conduit 15 approximately one-half of this solution is returned, as washing liquid, to the extraction column B, the remainder (502 kg.) is being passed through conduit 16 to stripping column Q to remove dissolved butanol from it, after which 472 kg. of an aqueous solution of nitric acid and phosphoric acid are obtained.

This last mentioned solution, which is passed through conduit 17 to the extraction column D, has the following composition:

| | kg. |
|---|---|
| $HNO_3$ | 33 |
| $H_3PO_4$ | 137 |
| $Ca(NO_3)_2$ | 0.5 |
| $H_2SiF_6$ | 0.5 |
| Water | 301 |

In column D the separation between nitric acid and phosphoric acid is effected by passing into the bottom of column D 1500 kg. of methyl-isobutyl ketone supplied through conduits 29, 31, and 22, and 50 kg. of water.

Furthermore, 27 kg. of wash water containing

| | kg. |
|---|---|
| $HNO_3$ | 2 |
| $H_3PO_4$ | 3 |
| Methyl-isobutyl ketone | 2 | are passed into the top of column D through conduit 26.

The resulting products are 454 kg. of an aqueous phosphoric acid solution with the following compositions:

| | kg. |
|---|---|
| $H_3PO_4$ | 137 |
| Water | 311 |
| Methyl-isobutyl ketone | 5 |
| $Ca(NO_3)_2$ | 0.5 |
| $H_2SiF_6$ | 0.4 | and 1595 kg. of methyl-isobutyl ketone containing mainly nitric acid and having the following composition:

| | kg. |
|---|---|
| Methyl-isobutyl ketone | 1497 |
| $HNO_3$ | 35 |
| Water | 60 |
| $H_2SiF_6$ | 0.1 |
| $H_3PO_4$ | 3 |

The aqueous phosphoric acid solution is passed through conduit 19 to stripping column R, where it is freed of methyl-isobutyl ketone.

Through conduit 23 445 kg. of 31%-by-weight phosphoric-acid solution is passed to evaporator L to be further concentrated. The water evaporated is discharged through conduit 25 and is re-used in the process. The resulting phosphoric acid is relatively pure and very suitable for the preparation of dicalcium phosphate of animal-feed grade sodium phosphates for the detergent industry.

To obtain a very pure acid, the impurities (Al, Fe, Ca) still have to be removed from the resulting phosphoric acid. This may be done by, for example, the use of ion exchangers.

The methyl-isobutyl ketone containing nitric acid is passed through conduit 20 to the washing column E, where it is washed with water supplied from reservoir 30a through conduit 27, during which process any phosphoric acid contained in it is taken up. The wash water is discharged from the bottom of column E through conduit 26 and is returned to the top of column D.

From the top of column E the methyl-isobutyl ketone containing nitric acid and a small amount of water is passed through conduit 21 to neutralizer N, where it is neutralized with $NH_3$. The neutralized solution is passed from the neutralize N through conduit 28 to the separating apparatus O, in which two layers are formed, viz., an aqueous lower layer containing ammonium nitrate and an upper layer of methyl-isobutyl ketone in which a small amount of water has been dissolved. This upper layer is recycled to extraction column D through conduit 29.

The lower layer containing ammonium nitrate consists of:

| | kg. |
|---|---|
| NH$_4$NO$_3$ | 41.8 |
| Water | 30 |
| Methyl-isobutyl ketone | 2 |

This layer is passed through conduit 32 to stripping column S, where it is freed of the dissolved methyl-isobutyl ketone, the resulting solution being then concentrated, in evaporator M, to an ammonium-nitrate melt, which may be processed to solid grains in a known way.

The term "poorly water-miscible" as used herein is intended to mean that the agent is not more than 0.5 to 10% by weight, soluble in water.

Various modifications may be made in the invention described herein without deviation from the scope thereof as defined in the following claims.

We claim:

1. A process for recovering phosphoric acid from aqueous solutions containing nitric acid and phosphoric acid, which comprises extracting the solution at a water content of at most 70% by weight and at least 40% by weight, using an extracting agent selected from the group consisting of poorly water-miscible lower aliphatic ketones and lower aliphatic ethers, the weight ratio between the solution and the extracting agent being kept between the limits 1:1 and 1:3, whereby nitric acid is preferentially taken up by said extracting agent and concentrating the resulting aqueous solution of phosphoric acid essentially free from nitric acid.

2. A process according to claim 1 wherein the extracting agent is methyl-isobutyl ketone.

3. A process according to claim 1 wherein the starting solution containing phosphoric acid and nitric acid and having a water content of at most 70 and at least 40% by weight is obtained by decomposing phosphate rock with concentrated nitric acid with an HNO$_3$ content of at least 45% by weight, lowering the molar CaO/P$_2$O$_5$ ratio of the resulting solution to below 1.5 by removing calcium nitrate by cooling, subsequently subjecting the solution to an extraction with a poorly water-miscible lower aliphatic alcohol, washing the resulting extract containing acids and a little calcium nitrate with a small amount of acid solution with at least 25% by weight of acid so that said extract is virtually free of calcium nitrate and subsequently washing said extract with such an amount of water that not more than ¾ of the total amount of acid still present passes from the aliphatic alcohol into the water.

4. A process for separating phosphoric acid and nitric acid which comprises adjusting the concentration of said solution to a water content of 40–70% by weight and an acid concentration of 60–30% by weight, then extracting essentially all of the nitric acid from said solution by contacting the solution with an extracting agent selected from the group consisting of poorly water-miscible lower aliphatic ketones and lower aliphatic ethers, the weight ratio of the solution to extracting agent being kept between the limits of 1:1 and 1:3, and then concentrating the resulting aqueous solution of phosphoric acid.

5. The process of claim 4 wherein the solution of nitric acid and phosphoric acid is obtained by decomposing phosphate rock with concentrated nitric acid.

References Cited

UNITED STATES PATENTS

| 3,205,002 | 9/1965 | Gattiker et al. | 71—39 |
| 3,245,777 | 4/1966 | Chang | 23—165 X |

FOREIGN PATENTS 672,008   10/1963   Canada.

MILTON WEISSMAN, *Primary Examiner.*

OSCAR R. VERTIZ, *Examiner.*

A. J. GREIF, *Assistant Examiner.*